Figure 1:
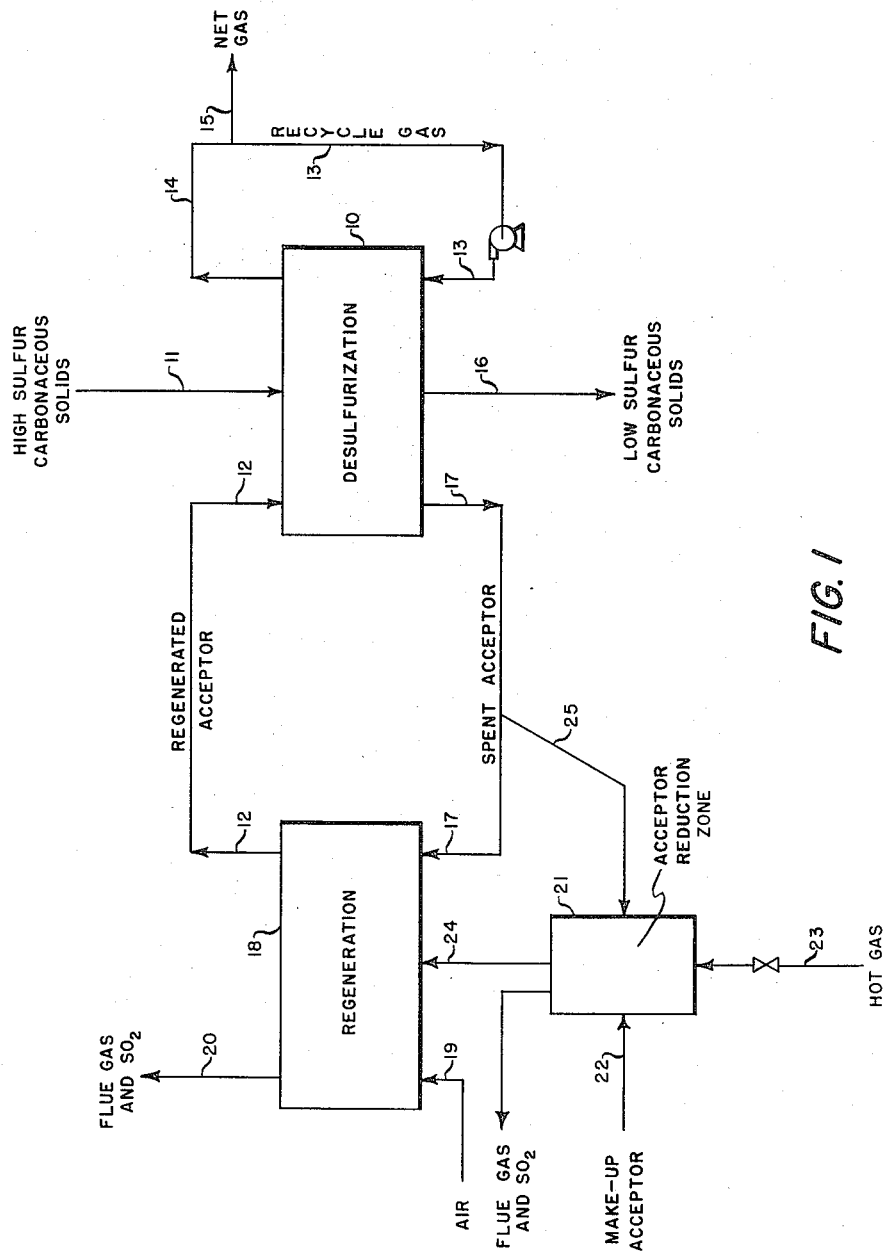

Aug. 23, 1960     J. D. BATCHELOR ET AL     2,950,231

MANGANESE ORE ACCEPTORS FOR HYDROGEN SULFIDE

Filed Feb. 13, 1958

INVENTORS
JAMES D. BATCHELOR
GEORGE P. CURRAN
EVERETT GORIN

BY

*Harry B. Keck*

ATTORNEY

2,950,231

MANGANESE ORE ACCEPTORS FOR HYDROGEN SULFIDE

James D. Batchelor, Bethel Park, and George P. Curran and Everett Gorin, Pittsburgh, Pa., assignors to Consolidation Coal Company, Pittsburgh, Pa., a corporation of Pennsylvania Filed Feb. 13, 1958, Ser. No. 715,058

6 Claims. (Cl. 202—31)

The present invention relates to solid acceptors for hydrogen sulfide which are suitable for use in desulfurization treatment of carbonized carbonaceous solid fuels. More particularly, the present invention concerns naturally occurring manganese ore which is suitable for use as a solid hydrogen sulfide acceptor.

The present invention is particularly applicable to a desulfurization system described in copending U.S. patent application S.N. 527,705, now U.S. Patent 2,824,047, filed August 11, 1955, by Everett Gorin, George P. Curran and James D. Batchelor, assigned to the assignee of the present invention.

According to the above-mentioned patent application S.N. 527,705, carbonaceous solid fuels can be desulfurized by treatment in a hydrogen atmosphere in the presence of a solid acceptor for hydrogen sulfide. The sulfur from the carbonaceous solid fuel combines with hydrogen gas to form hydrogen sulfide. The presence of small quantities of hydrogen sulfide in the vapor phase serves to inhibit further reaction between hydrogen and sulfur. By providing a solid acceptor for the hydrogen sulfide, the inhibiting gas can be removed from the vapor almost immediately upon formation. Thus the newly formed hydrogen sulfide gas is prevented from exerting an inhibiting influence. Highly efficient desulfurization of the carbonaceous solid fuels results.

The solid acceptor for hydrogen sulfide thereafter is separated from the desulfurized carbonaceous solid fuels. The solid acceptor which contains sulfide thereafter is regenerated by treatment with air at elevated temperatures. Oxygen from the air combines with and removes the accepted sulfur of the solid acceptor and restores the hydrogen sulfide accepting property of the solid acceptor. The regenerated solid acceptor thereafter can be reused for further desulfurization treatments.

Specifically, where solid acceptors containing manganese oxide are used, the reaction in the solid fuels desulfurization zone is as follows:

$$MnO + H_2S \rightarrow MnS + H_2O$$

The sulfided acceptor thus contains manganese sulfide. Regeneration of the sulfided acceptor in the presence of air is as follows:

$$MnS + \tfrac{3}{2}O_2 \rightarrow MnO + SO_2$$

By restoring the active ingredient of the solid acceptor to the manganese oxide form, the solid acceptor is suitable for reuse in further solid fuels desulfurization treatment.

According to the present invention, a preferred acceptor is a naturally occurring manganese oxide ore containing less than about 20 percent by weight of impurities such as silica, alumina, calcium and iron. We have found that such naturally occurring ores of suitable particle size can be employed as the solid acceptor for hydrogen sulfide in the described desulfurization process for carbonized carbonaceous solid fuels.

A further preferred acceptor is a naturally occurring manganese oxide ore consisting essentially of manganese oxide in the form of Ramsdellite and containing less than about 20 percent by weight of impurities such as silica, alumina, calcium and iron. We have found that manganese oxide ores consisting essentially of Ramsdellite can be employed directly in the described cyclic desulfurization process without requiring preliminary briquetting, calcining and crushing. Other manganese oxide ores (meeting the purity requirements) such as those consisting essentially of pyrolusite can be employed as the solid acceptor in the described desulfurization process provided the ores are firstly briquetted, calcined, and thereafter crushed to the desired particle size. We have found that this preliminary treatment is not required with the manganese oxide ore consisting essentially of Ramsdellite.

Naturally occurring manganese oxide ores contain the manganese oxide principally in the form of $MnO_2$. In this form, the manganese oxide can assume several crystalline structures such as the Ramsdellite form or the pyrolusite form, Ind. Eng. Chemistry, 42, 523–7 (1942).

High purity manganese ores in the pyrolusite form are produced in Morocco. High purity manganese ores in the Ramsdellite form are produced in the Gold Coast region (Ghana) of West Africa. The principal impurities in both ores are silica, alumina, iron and calcium. Both materials are commercially available in North America.

The environment of the present invention will be described briefly in connection with the accompanying drawing which is a schematic flow design illustrating a desulfurization process for carbonaceous solid fuels employing solid acceptors for hydrogen sulfide.

The generalized flow sheet of Figure 1 illustrates the manner in which an acceptor desulfurization process can be carried out in a continuous manner. A desulfurization zone 10 receives non-caking carbonaceous solids containing sulfur through a conduit 11 and regenerated acceptor solids through a conduit 12. In this instance, the active ingredient of the acceptor solids is manganese oxide. A hydrogen-rich treating gas consisting essentially of hydrogen is introduced into the desulfurization zone 10 through a conduit 13. Additional gases, consisting of hydrogen gas, are autogenously produced through devolatilization of the carbonaceous solids at the elevated temperature of the desulfurization zone 10. Under preferred operating conditions the autogenously produced devolatilization gases will be in sufficient quantity to provide the full hydrogen requirements for desulfurization so that extrinsic hydrogen production is not required.

The desulfurization zone 10 is maintained at a temperature from about 1100 to about 1600° F. Below about 1100° F., the desulfurization rate is low. Operation above about 1600° F. requires excessive heat. The pressure level preferably is high enough to provide a hydrogen gas partial pressure of at least one atmosphere. A total pressure of from one to six atmospheres is preferred.

A typical char (containing sulfur) produced by fluidized carbonization of Pittsburgh Seam coal at 950° F. yields devolatilization gases containing 58.6 percent hydrogen and 24.8 percent methane at 1.3 atmospheres and 1350° F. The same char yields devolatilization gases containing 48.7 percent hydrogen and 32.9 percent methane at 3 atmospheres and 1350° F.

During passage through the desulfurization zone 10, the treating gases remove sulfur from the carbonaceous solid fuels $$(-C=S) + H_2 \rightarrow H_2S + (-C)$$

forming hydrogen sulfide.

The H₂S upon formation, is at once absorbed by the solid acceptor and removed from the gas phase.

$$H_2S + MnO \rightarrow MnS + H_2O$$

Gases are recovered from the desulfurization zone 10 through a conduit 14 and recirculated through conduit 13 for further contact with carbonaceous solids undergoing desulfurization. A net product gas is removed through a conduit 15.

The required residence of a carbonaceous solid in the desulfurization zone 10 depends upon the liability of the contaminating sulfur and also upon the level of desulfurization desired. It must be borne in mind that the ultimate sulfur level of the product is determined by the level of H₂S concentration which the manganese oxide will maintain. Where the hydrogen partial pressure of the treating gases is about one atmosphere or greater, satisfactory desulfurization can be achieved by subjecting the carbonaceous solids to the desulfurization conditions for a period of about three hours or less. Increased absolute pressure promotes more rapid desulfurization.

Desulfurized carbonaceous solids are removed from the desulfurization zone 10 as product through a conduit 16. Sulfided acceptor is removed through a conduit 17 and passed to an acceptor regeneration zone 18. Air is introduced into the regeneration zone 18 through a conduit 19 to raise the temperature of the acceptor through combustion of sulfur along with a portion of the carbonaceous solids commingled therewith and to remove sulfur therefrom through oxidation to sulfur dioxide.

$$MnS + \tfrac{3}{2}O_2 \rightarrow MnO + SO_2 + heat$$

The temperature within the regeneration zone 18 is maintained at about 1300 to 1800° F. Hot flue gases containing sulfur dioxide are removed from the regeneration zone 18 through a conduit 20.

Excessive oxidation in the regeneration zone 18 should be avoided in order to restrict the quantity of higher oxides of manganese produced. Ideally, some of the acceptor solids recovered from the regeneration zone 18 should be in the form of MnS. By maintaining from about 2 to about 15 percent of the manganese as MnS after regeneration, the oxides of manganese can be maintained principally in the form of MnO rather than as higher oxides such as $Mn_3O_4$ or $Mn_2O_3$. The presence of higher oxides of manganese in the desulfurization zone undesirably consumes hydrogen gas without accompanying sulfur removal. In general, the amount of oxygen used in the regeneration zone 18 should be within about 20 percent of the stoichiometric quantity, which would be required for oxidizing all of the MnS to MnO according to the equation above.

Regenerated acceptor is returned to the desulfurization zone 10 through the conduit 12 without deliberate cooling to serve therein as a means for removing H₂S therefrom and to supply the heat requirements thereof.

EXAMPLES

While investigating the described desulfurization process for carbonaceous solid fuels, a variety of solid acceptors containing manganese oxide has been employed.

A. *Pure manganese oxide*

A solid acceptor was prepared from essentially pure manganese oxide.

A suitable solid acceptor can be prepared from substantially pure manganese oxide. Crystals of manganese nitrate are decomposed at a temperature above about 400° F. to convert the manganese nitrate into $MnO_2$. The $MnO_2$ thereupon is briquetted and calcined at a temperature above 2000° F. for about two hours. The calcined briquets thereupon are crushed and the crushed briquets are screened to produce the desired particle size of substantially pure manganese oxide, principally $Mn_3O_4$. These particles are eminently suitable as a hydrogen sulfide acceptor in the described desulfurization process. Preferably the particles are preliminarily reduced to MnO before introduction into the desulfurization system. Such solid acceptors are quite expensive because they require pure starting materials and require preliminary processing.

B. *Manganese oxide acceptor on porous inert supports*

As described in the aforementioned patent application S.N. 527,705, suitable hydrogen sulfide acceptors can be prepared by impregnating manganese salts on porous inert supports such as silica, alumina and silica-alumina. These materials are relatively expensive because of the nature of fabrication. In addition, the solid acceptor tends to become deactivated through reaction of the manganese with silica or alumina at elevated temperatures. Since the cyclic desulfurization and regeneration process is carried out at elevated temperatures, deactivation of supported acceptors is a major problem. The deactivation phenomenon can be offset as described in copending patent applications S.N. 692,865, filed October 28, 1957, S.N. 692,897, filed October 28, 1957, and S.N. 695,467, filed November 8, 1957, by the present inventors and assigned to the assignee of the present application.

C. *Naturally occurring manganese ore acceptors*

We prefer to employ as the solid acceptors in the described desulfurization process a naturally occurring manganese oxide ore containing less than 20 percent by weight of impurities such as silica, alumina, calcium and iron. Such manganese ores are readily available commercially. Manganese ores of this high degree of purity are mined in portions of Africa. Manganese ores from Morocco, for example, consists essentially of $MnO_2$ in the form of pyrolusite. Analysis of these ores shows the manganese oxide content greater than 80 percent. The principal impurities are silica, alumina, calcium and iron. Unfortunately, the manganese ores which consist essentially of pyrolusite tend to decrepitate in handling and must receive some preliminary treatment before they will resist abrasion in the described desulfurization process. This treatment is similar to that already described supra for the pure manganese oxide. The natural ore is briquetted at a pressure of 5000 to 10,000 p.s.i.g. The briquets are calcined at a temperature of about 2000° F. or higher for a period of one or more hours. The calcined briquets thereafter are crushed and screened to produce particles of the desired size for use in the described desulfurization process.

We have found that unexpectedly the manganese ores consisting essentially of Ramsdellite do not require preliminary treatment. The Ramsdellite ore can be crushed in its naturally occurring state to produce particles of the desired size which can be used directly as a solid acceptor in the described desulfurization process. One sample of Gold Coast ore had the following analysis.

| Component: | Percent by weight |
|---|---|
| MnO₂ (principally Ramsdellite) | 85.6 |
| Mn₂O₃ | 3.0 |
| Fe₂O₃ | 1.3 |
| Al₂O₃ | 1.8 |
| SiO₂ | 3.0 |
| Other oxides | 0.3 |
| Water | 5.0 |

Since the manganese oxide of naturally occurring ores exists principally as $MnO_2$, it is desirable to reduce the oxide to the form of MnO prior to its introduction into the desulfurization zone 10. Higher oxides of manganese consume hydrogen without accompanying desulfurization.

Where ores of the naturally occurring pyrolusite form are employed as acceptor, the preliminary calcining treatment serves to convert the manganese oxide principally to the $Mn_3O_4$ form. However, where the Ramsdellite type of manganese ore is used, preliminary calcining is not required.

The recirculating solid acceptor will be in the MnO form. Incremental quantities of the Ramsdellite type ore, supplied as make-up acceptor solids, will consume only insignificant quantities of hydrogen which can be discounted. For initial operation, however, the Ramsdellite ore preferably is preliminarily reduced.

Conveniently this may be accomplished by heating the fresh ore with a quantity of hydrogen-containing devolatilization gases from carbonaceous solids. Any other convenient source of reducing gases may be used.

After the desulfurization system has been operated to establish equilibrium conditions, incremental quantities of fresh Ramsdellite ore may be reduced by interaction with recirculating sulfided acceptor particles without consuming hydrogen gas.

As shown in the drawing, an acceptor reduction zone 21 may be provided for this purpose. Fresh Ramsdellite ore of the desired particle size composition is introduced into the acceptor reduction zone through a conduit 22. Hot gases are introduced through a conduit 23 to heat the fresh Ramsdellite to a temperature above about 1500° F., for example, 1500 to 1800° F. to effect preliminary partial reduction. The make-up acceptor, at least partially reduced, is introduced into the recirculating stream of acceptor, for example through a conduit 24 into the regeneration zone 18.

Alternatively, a portion of recirculating sulfided acceptor particles may be withdrawn through a conduit 25 for reaction with fresh make-up acceptor particles in the reduction zone 21.

$$3MnO_2 + MnS \rightarrow 4MnO + SO_2$$

The same reaction also would proceed to some extent when the fresh make-up acceptor is introduced directly into the regeneration vessel 18 as suggested. Accordingly, the make-up acceptor may be added directly into the regeneration zone 18 where the make-up quantity will represent only an insignificant fraction of the total inventory of recirculating acceptor.

The particle size selected for the solid acceptor depends upon the nature of the contacting process within the desulfurization zone 10. The acceptor should be of such size that it may be separated readily from the desulfurized carbonaceous solid fuels. Where the carbonaceous solid fuels are finely divided, the acceptor preferably is of a relatively large size. Where relatively large carbonaceous solid fuel briquets are being desulfurized, the solid acceptor preferably comprises particles of fluidizable size.

ATTRITION RESISTANCE

To compare the relative attrition resistance of suitable solid hydrogen sulfide acceptors, comparative strength indices were determined in an impact test at 1200° F. The index corresponds to the resistance of the tested material to attrition. A high index indicates high attrition resistance.

(1) A sample of Ramsdellite ore screened to pass through a 4 mesh screen and be retained on an 8 mesh screen was prepared. The attrition index of this material was 45,000.

(2) A sample of pyrolusite ore prepared from powdered ore passing through a 300 mesh screen was briquetted, calcined, crushed and screened through a 4 mesh screen onto an 8 mesh screen. This material had an attrition index of 5,400.

(3) A sample of manganese-oxide impregnated alumina spheres, ¼-inch in diameter, was subjected to the same attrition test. The attrition index for the alumina spheres was 690.

Thus it appears that the naturally occurring manganese ore consisting essentially of Ramsdellite is superior in abrasion resistance to the other materials being tested. The briquetted, calcined, crushed and screened pyrolusite ores were markedly superior to the alumina spheres. In both instances the naturally occurring ore showed superior abrasion resistance to that of the impregnated inert supports.

The Ramsdellite ore acceptor can be handled in fluidized beds through desulfurization and regeneration cycles without experiencing particle agglomeration. Neither size decrepitation nor loss in activity was observed in Ramsdellite or calcined pyrolusite acceptors during desulfurization at 1350° F. and regeneration at 1800° F.

In addition to their relatively low initial cost, the naturally occurring ore solid acceptors are technologically superior in terms of life, abrasion resistance and resistance to deactivation phenomena.

The naturally occurring high manganese content ores can be used in any cyclic sulfur removal process which employs hydrogen as a sulfur transferring medium. Gaseous streams and vaporized sulfur-containing liquids can be desulfurized as well as the carbonaceous solid fuels herein described.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A solid acceptor for hydrogen sulfide consisting essentially of finely divided particles of a naturally occurring manganese ore consisting essentially of pyrolusite and containing less than about 20 percent of silica, alumina, calcium and iron, said particles being obtained by briquetting said ore to produce briquets of a selected particle size distribution and then calcining the resulting briquets to produce a suitable solid acceptor.

2. The method for preparing a solid acceptor for hydrogen sulfide which comprises briquetting finely divided naturally occurring manganese ore consisting essentially of pyrolusite and containing less than about 20 percent of silica, alumina, calcium and iron, calcining the resulting briquet, crushing the calcined briquet, and screening the crushed, calcined briquet to produce a suitable solid acceptor of a selected particle size distribution.

3. In a process for removing sulfur from sulfur-containing particulate carbonaceous solids which comprises preparing an intimate admixture of said carbonaceous solids and of particulate solid acceptors consisting essentially of a manganese oxide ore containing less than about 20 percent of alumina, silica, calcium and iron, subjecting said admixture to treatment at a temperature above 1100° F. in the presence of hydrogen gas to remove sulfur from said carbonaceous solids as hydrogen sulfide which is absorbed by said acceptors to form manganese sulfide, followed by oxidizing the manganese sulfide to manganese oxide by reaction with oxygen to provide regenerated acceptors for reuse in the process, wherein the acceptors in admixture with the carbonaceous solids suffer a decrease in strength, the improvement which minimizes loss of the acceptors' strength under process conditions comprising initially preparing an intimate admixture of carbonaceous solids and particulate solid acceptors wherein said manganese oxide ore is a member selected from the class consisting of (1) a naturally occurring crushed, screened fraction of selected particle size distribution consisting essentially of Ramsdellite and (2) finely divided particles consisting essentially of pyrolusite, said pyrolusite particles being obtained by briquetting the ore to produce briquets of selected particle-size distribution and then calcining the resulting briquets to produce suitable solid acceptors.

4. The process of claim 3 wherein the manganese ore consists essentially of said pyrolusite.

5. The method of claim 3 wherein the manganese ore consists essentially of said Ramsdellite.

6. The method of claim 3 wherein the manganese ore is preliminarily contacted with hot hydrogen-containing gases to effect its partial reduction.

References Cited in the file of this patent

UNITED STATES PATENTS

| | | |
|---|---|---|
| 1,606,470 | Grant et al. | Nov. 9, 1926 |
| 1,937,488 | Jenness | Nov. 28, 1933 |
| 1,976,806 | Rosen et al. | Oct. 16, 1934 |
| 2,436,340 | Upham et al. | Feb. 17, 1948 |
| 2,462,277 | Naugle | Feb. 22, 1949 |
| 2,824,047 | Gorin et al. | Feb. 18, 1958 |